No. 776,476. PATENTED NOV. 29, 1904.
E. LOGAN.
CUTTING MACHINE FOR PLASTIC MATERIALS.
APPLICATION FILED FEB 18, 1904.
NO MODEL. 2 SHEETS—SHEET 1.
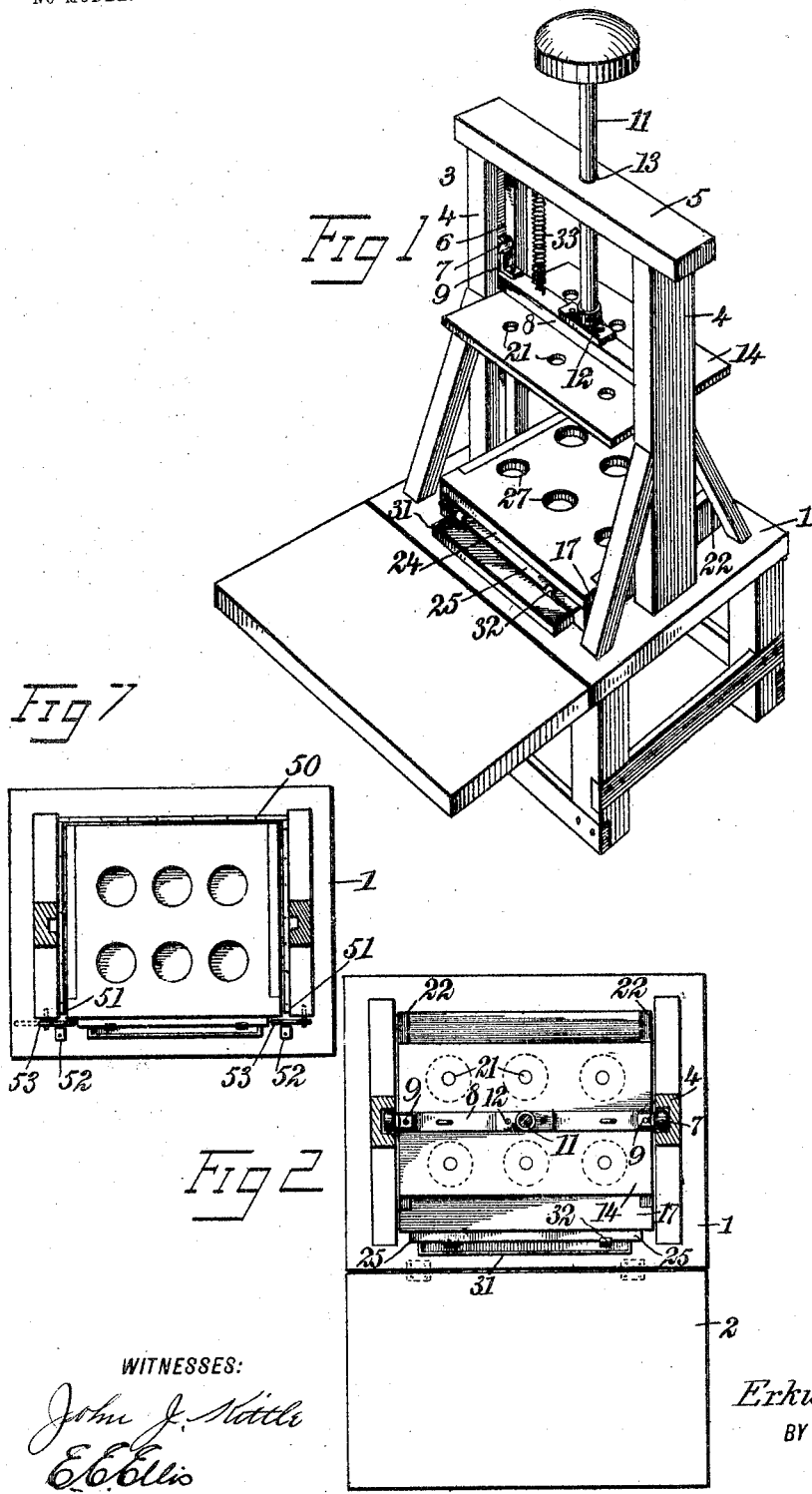
WITNESSES:
INVENTOR
Erkwood Logan
BY
ATTORNEYS No. 776,476. PATENTED NOV. 29, 1904.
E. LOGAN.
CUTTING MACHINE FOR PLASTIC MATERIALS.
APPLICATION FILED FEB. 18, 1904.
NO MODEL. 2 SHEETS—SHEET 2.
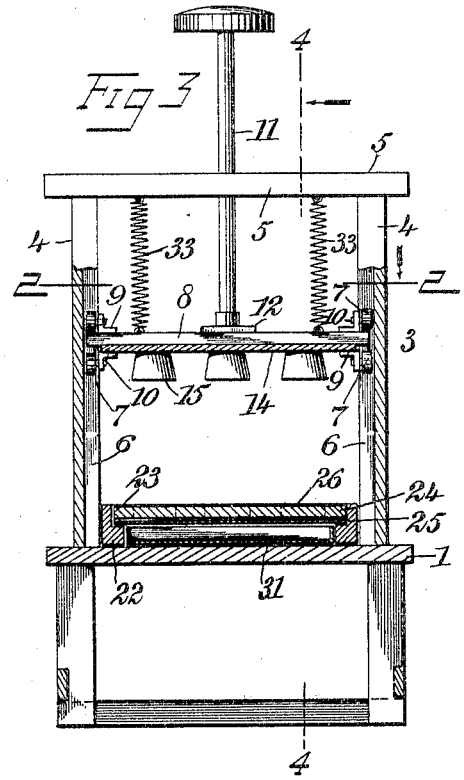
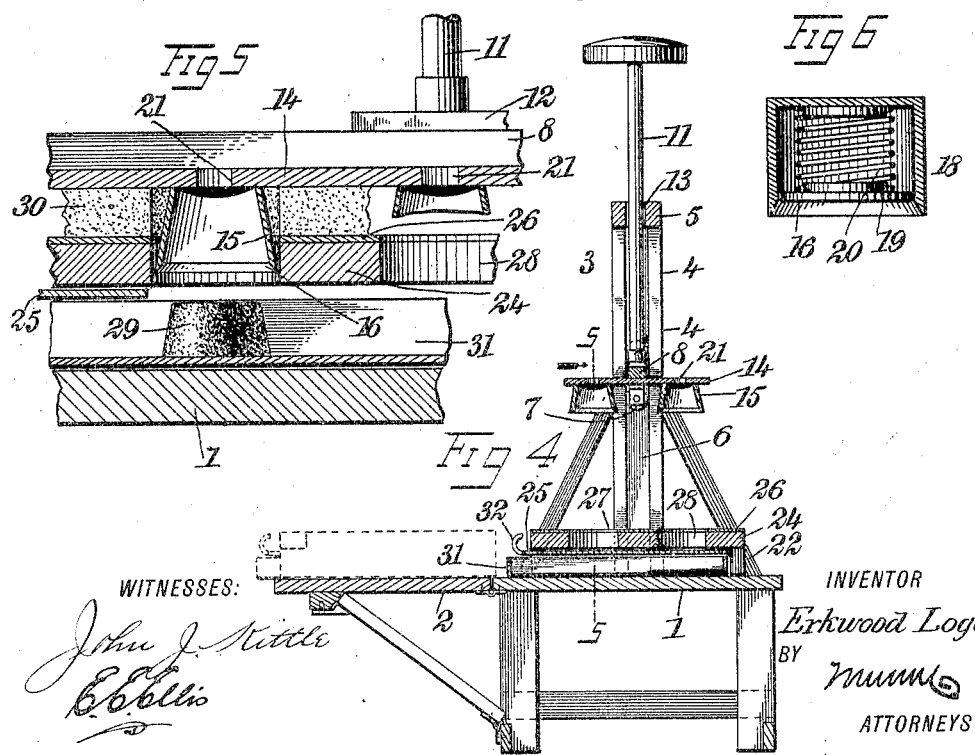
WITNESSES:
John J. Kittle
E. C. Ellis
INVENTOR
Erkwood Logan
BY Munn
ATTORNEYS No. 776,476. Patented November 29, 1904.

UNITED STATES PATENT OFFICE.

ERKWOOD LOGAN, OF PHILADELPHIA, PENNSYLVANIA.

CUTTING-MACHINE FOR PLASTIC MATERIALS.

SPECIFICATION forming part of Letters Patent No. 776,476, dated November 29, 1904.

Application filed February 18, 1904. Serial No. 194,138. (No model.)

*To all whom it may concern:*

Be it known that I, ERKWOOD LOGAN, a citizen of the United States, and a resident of Philadelphia, in the county of Philadelphia and State of Pennsylvania, have invented a new and Improved Cutting-Machine for Plastic Materials, of which the following is a full, clear, and exact description.

My invention relates to machines for cutting disks or sections from a sheet of plastic material, and is particularly intended for cutting biscuit, cakes, or crackers from a sheet of dough.

The object of my invention is to provide a machine which will cut a number of disks simultaneously and deposit them in a suitable receptacle in one operation.

I further aim to produce a machine having a minimum number of operating parts compact in structure and which may be attached to any table or other suitable support.

An important feature of my invention consists in the use of a device whereby the usual rolling-board is dispensed with and the dough or other plastic material is spread or rolled directly upon the die-plate. I accomplish this purpose by placing a slide under the die-plate to close the openings therein and prevent the dough from being forced therethrough during the rolling process.

Another feature consists in the arrangement of the die-plate, slide, and receptacle for the disks or biscuit in a frame which may drawn forward upon the operating-table during the rolling process and afterward placed within the frame with the dies in alinement with the cutters, thus keeping the separate parts of the machine assembled in their proper relation and ready to be brought under the cutters as soon as the rolling process is completed.

My invention will be better understood by reference to the following description and accompanying drawings, forming a part of this specification, in which similar characters of reference indicate corresponding parts in all the figures, while its scope will be pointed out in the appended claims.

Figure 1 is a perspective view of my machine, showing the parts mounted in operative relation upon a table. Fig. 2 is a horizontal section taken on the line 2 2 of Fig. 3. Fig. 3 is a front elevation thereof, partly in section. Fig. 4 is a sectional side elevation taken on the line 4 4 of Fig. 3 looking toward the left. Fig. 5 is an enlarged sectional view on the line 5 5 of Fig. 4 looking toward the right. Fig. 6 is a sectional side elevation of a modified form of the cutter; and Fig. 7 is a detail plan view, partly in horizontal section, showing a modification in the construction of the operating-table.

1 is an operating-table having an extension-leaf 2, and 3 is a frame having side members 4 and a top frame-bar 5. The side members are grooved or channeled at 6 to act as guides for rollers 7, secured to the bolster or guiding-bar 8 of the cutter-head by means of angle-irons 9, carrying pivot-pins 10. An operating-handle 11 is secured to the bolster 8 by a socket connection 12 and is guided in a hole 13 in the top frame member 5. Supported by the bolster 8 is a cutter head or plate 14, having depending cutters 15. These cutters are provided with cutting edges 16 and may have parallel sides 18, as in the form illustrated in Fig. 6. In this form I supply the cutter with a plunger 19, carried by a spring 20, mounted in the top of the cutter. The purpose of this spring is to expel the disk after it has been cut from the sheet of plastic material. I prefer, however, to use the more simple form of cutter shown in Figs. 3, 4, and 5, in which the sides are tapering or flaring outwardly. When I employ this type of cutter, I provide the cutter-head with apertures 21 for the escape of air during the cutting process and also that the air-pressure upon the upward movement of the cutter-head may expel the disk in the manner clearly shown in Fig. 5.

Supported upon the table 1 is a frame 22, channeled at 23 to receive a base-plate 24 and slide 25. Secured to the base-plate 24 is a die-plate 26, having apertures 27, which cooperate with the cutters 15 to cut the disks 29 from the plastic sheet 30. The base-plate is provided with openings 28, which register with the apertures in the die-plate, for a purpose to be presently explained, and with lugs or projections 17 to engage the ends of the side members of the frame 22. Fitting loosely in the frame 22 and guided by the side members thereof is a receptacle 31, adapted to receive the disks as they are expelled from the cutters. The slide 25 is provided with a finger-piece 32, whereby it may be adjusted as desired, and the bolster or guiding-bar 8 is connected with the frame-bar 5 by springs 33.

The operation of my machine will be clearly understood from the foregoing description. The parts being assembled as shown in Fig. 1, the frame 22 is drawn forward on the operating-table into the position indicated in dotted lines in Fig. 4. The dough or other plastic material is now placed on the die-plate and rolled into a sheet of the desired thickness, the slide 25 under the base-plate 24 closing the openings 28 therein and preventing the plastic material from being forced therethrough. The frame 22 may now be moved again into the position shown in Fig. 1, bringing the apertures 27 into vertical alinement with the cutters 15. After withdrawing the slide 25 by means of the handle 32 the cutter-head 14 is forced downwardly by means of the handle or operating-rod 11 until the cutters are brought into the position indicated at the left in Fig. 5, causing the disks 29 to be cut from the plastic material 30 and deposited in the receptacle 31. In case the disks should adhere to the inner wall of the cutter they will be immediately expelled when the cutter-head begins to ascend by reason of the air rushing through the apertures 21. When the cutter illustrated in Fig. 6 is employed, the disk will be expelled by the spring 20, acting upon the plunger 19. As soon as the hand of the operator is removed from the handle 11 the cutter-head will be raised to its normal position by the retractile springs 33. The receptacle may now be replaced by another and the slide 25 returned to the position first described, when the operation may be repeated.

From the foregoing description it will be apparent that I have provided a machine which may be operated with great rapidity and which may be readily secured to an ordinary operating-table. It has a minimum number of operating parts which are simple in construction and are not liable to get out of order. I prefer to make the die plate and cutters of tinned sheet-iron, commonly known as "tin," while the frame parts may be of wood or other material.

While I have set forth and illustrated a particular arrangement of mechanism to accomplish the purposes of my invention, I do not wish to be restricted thereby, but aim to cover all modifications thereof which may be regarded as the equivalents of the structure described and shown.

As shown in Fig. 7, I may employ means on the operating-table 1 for preventing movement of the frame 22 when the latter is in operative position beneath the cutter head or plate 14, said means consisting of a three-sided relatively stationary frame 50, beyond the ends 51 of which are blocks 52, while pivoted to parts of the supporting-framework are latches 53, which may be turned down behind the blocks in a manner to project before the forward ends of said frame 22, thus preventing the latter from being moved or withdrawn until said latches are turned outwardly, as is apparent.

While I have illustrated and referred throughout to a "slide" 25, it will be obvious that an endless apron could be substituted therefor without departing from the spirit of my invention.

Having thus described my invention, I claim as new and desire to secure by Letters Patent—

1. A machine for cutting disks from a sheet of plastic material, comprising a base member for supporting said plastic sheet and provided with openings, means for closing and exposing said openings, means for cutting disks from said plastic sheet, and means for expelling said disks into said openings.

2. A machine for cutting disks from a sheet of plastic material, comprising a base member provided with openings, a die member thereon having apertures registering with said openings, means for closing and exposing said openings, means for cutting disks from said plastic sheet, and means for expelling said disks into said openings.

3. A machine for cutting disks from a sheet of plastic material, comprising a base member provided with openings, a die member thereon having apertures registering with said openings, means for closing and exposing said openings, a frame providing guideways and stops for said base and die members, means for cutting disks from said plastic sheet, and means for expelling said disks from said openings.

4. A machine for cutting plastic material, comprising a base having a frame secured thereto, a die-plate provided with apertures, a receptacle in operative relation with said die-plate, means for opening or closing said apertures, a manually-controlled cutter-head guided by said frame and having depending cutters adapted to move into said apertures, and retractile means for normally holding said cutter-head in an elevated position.

5. A machine for cutting plastic material, comprising a base having a frame secured thereto, a die-plate provided with apertures, a receptacle in operative relation with said die-plate, means for opening or closing said apertures, a manually-controlled cutter-head having an operating-rod working in said frame and having depending cutters adapted to move into said apertures, and retractile means for normally holding said cutter-head in an elevated position.

6. In a machine for cutting dough or other plastic material, the combination with a table or support, of a movable frame thereon, a die-plate provided with apertures, a slide in movable relation with said die-plate, a receptacle supported by said table and guided by said frame, and standards secured to said table and carrying cutters mounted to move into said apertures.

7. In a machine for cutting dough or other plastic material, the combination with a table or support, of a movable frame thereon, a die-plate provided with apertures, a slide in movable relation with said die-plate, a receptacle supported by said table and guided by said frame, standards secured to said table and carrying cutters mounted to move into said apertures, and a cutter-head having rollers engaging channels in said standards.

8. In a machine for cutting dough or other plastic material, the combination with a frame adapted to rest upon a table or other support, of a cutter mounted to reciprocate on said frame, a die-plate having an aperture in concentric alinement with said cutter, a slide arranged to close said aperture, and a receptacle in coöperative relation with said die-plate.

9. In a machine for cutting dough or other plastic material, the combination with a frame adapted to rest upon a table or other support, of a cutter mounted to reciprocate on said frame and yieldingly supported thereby, a die-plate having an aperture in concentric alinement with said cutter, a slide arranged to close said aperture, and a receptacle in coöperative relation with said die-plate.

10. In a machine for cutting dough or other plastic material, the combination with a frame adapted to rest upon a table or other support, of a cutter-head mounted to reciprocate on said frame and provided with a cutter, a die-plate having an aperture in concentric alinement with said cutter, a slide arranged to close said aperture, a receptacle in coöperative relation with said die-plate, and a channeled frame movable on said table and having said slide and receptacle slidingly mounted thereon.

11. In a machine for cutting dough or other plastic material, the combination with a table or support having standards secured thereto, of a reciprocating cutter plate or head guided in flanges on said standards and having cutters or stamping members depending therefrom, a die-plate provided with suitable apertures adapted to coöperate with said cutters, a base or bed plate supporting said die-plate and having openings registering with said apertures, a slide, a receptacle arranged to be moved under said bed-plate, and a frame forming a guide and support for said slide and bed-plate.

12. In a machine for cutting dough or other plastic material, the combination with a table or support having standards secured thereto, of a reciprocating cutter plate or head having cutters or stamping members depending therefrom, a die-plate provided with suitable apertures adapted to coöperate with said cutters, a base or bed plate supporting said die-plate and having openings registering with said apertures, a slide, a receptacle arranged to be moved under said bed-plate, and a frame forming a guide and support for said slide and bed-plate.

13. In a machine for cutting dough or the like, the combination with a frame, and a supporting-table, of a cutter mounted to work in said frame, a relatively stationary frame on the table, the same being open at one side, a slidable frame working therein, and means for engaging the ends of the stationary frame to prevent movement of the slidable frame when in operative position beneath the cutter.

14. In a machine for cutting dough or the like, the combination with a frame, and a supporting-table, of a cutter working in said frame, a relatively stationary frame on the table, a slidable frame working therein, and a pivoted latch for preventing movement of said latter frame in operative position beneath the cutter.

15. In a machine for cutting dough or other plastic material, the combination with a table or support having standards secured thereto, of a reciprocating cutter plate or head having cutters or stamping members depending therefrom, a die-plate provided with suitable apertures adapted to coöperate with said cutters, and a base or bed plate supporting said die-plate and having openings registering with said apertures.

16. In a machine for cutting dough or other plastic material, the combination with a table or support having standards secured thereto, of a cutter plate or head having cutters or stamping members depending therefrom, a die-plate provided with suitable apertures adapted to coöperate with said cutters, and a base or bed plate supporting said die-plates and having openings registering with said apertures.

In testimony whereof I have signed my name to this specification in the presence of two subscribing witnesses.

ERKWOOD LOGAN.

Witnesses:
 WILLIAM E. BRADLEY,
 JOS. H. KLEIN.